Feb. 22, 1966    C. E. MacKINNON    3,236,609
PRODUCTION OF HIGH PURITY SODIUM CHLORIDE
BRINE BY MULTISTAGE LEACHING
Filed April 11, 1963    2 Sheets-Sheet 1

INVENTOR.
CHARLES E. MACKINNON
BY
ATTORNEYS

Feb. 22, 1966     C. E. MacKINNON     3,236,609
PRODUCTION OF HIGH PURITY SODIUM CHLORIDE
BRINE BY MULTISTAGE LEACHING
Filed April 11, 1963     2 Sheets-Sheet 2
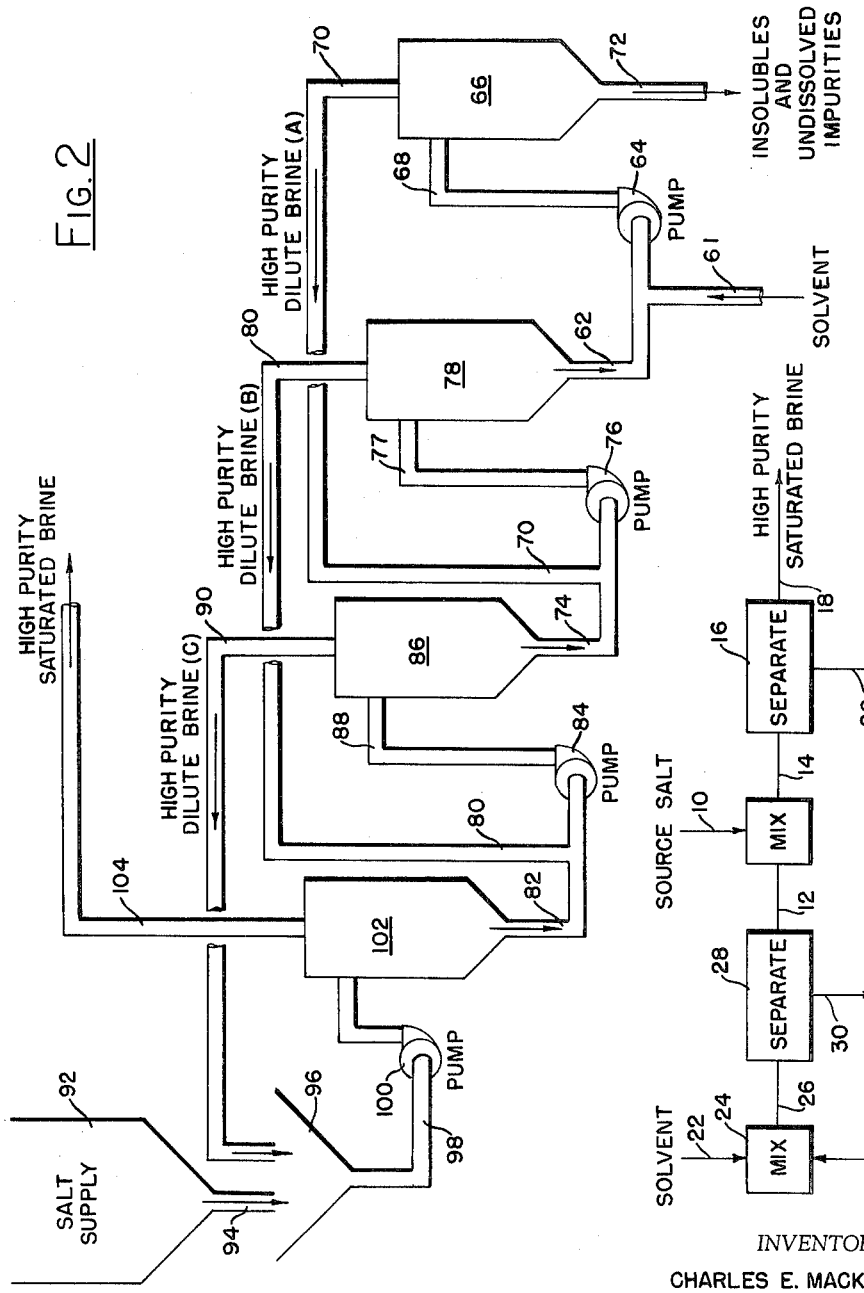
INVENTOR.
CHARLES E. MACKINNON
BY
*Beau, Brooks, Buckley, Beau.*
ATTORNEYS

United States Patent Office 3,236,609
Patented Feb. 22, 1966

3,236,609
PRODUCTION OF HIGH PURITY SODIUM CHLORIDE BRINE BY MULTISTAGE LEACHING
Charles E. MacKinnon, Lewiston, N.Y., assignor to International Salt Company, Clarks Summit, Pa.
Filed Apr. 11, 1963, Ser. No. 272,461
9 Claims. (Cl. 23—312)

This invention relates to an improved method for preparing relatively pure sodium chloride saturated brine from a contaminated supply material such as run-of-mine rock salt.

The major soluble impurity in mined rock salt is the mineral anhydrite, the anhydrous form of calcium sulfate ($CaSO_4$). Maximum solubility of calcium sulfate in a saturated sodium chloride brine at ordinary temperature and pressure is about 5.5 grams per liter of brine. In the equipment for the commercial production of sodium chloride brine, the amount of calcium sulfate contamination may be expected to range from about 1.5 to about 4.4 grams per liter of saturated brine, the range of about 1.5 to about 2.0 grams per liter of saturated brine being considered a good commercial sodium chloride brine in accordance with the practices of the prior art. In any case, the reduction of concentration of calcium sulfate below the maximum solubility as specified is achieved by reason of the fact that calcium sulfate is more slowly soluble than is sodium chloride and it thus becomes possible, in prior art practices, to effect a semi-isolation of the brine and the calcium sulfate so that periodic batch discharge of the semi-solated calcium sulfate may be used to effect some measure of brine purity.

In accord with the present invention, a commercial sodium chloride saturated brine may be prepared consistently and substantially continuously having a concentration of calcium sulfate substantially less than that achieved by prior art processes. An exception to the above is obtained in accordance with the process disclosed in the copending application of Dale W. Kaufmann filed February 11, 1963, Serial No. 261,929. In such copending application, a sodium chloride saturated brine may be prepared on a commercial basis having a concentration of calcium sulfate in the order of about 0.8 to about 1.0 gram per liter of saturated sodium chloride brine. In the present instance, a still further reduction in calcium sulfate content is realized, the same being in the order of 0.1 gram per liter of saturated sodium chloride brine, or less.

Furthermore, the present invention envisages a continuous and rapid flow system such that not only is a higher purity sodium chloride saturated brine produced, but such brine is produced more rapidly and efficiently than is accomplished by prior art processes.

It is of primary concern in connection with the present invention to provide a continuous flow system characterized by the provision of discrete zones, regions or stages within which the sodium chloride content of the brine being formed is progressively and successively increased.

Further, it is an object of this invention to provide a system as aforesaid wherein each zone or the like is initiated by the contacting of the system solvent with a supply of source salt and is terminated by a physical separation of liquids and solids.

Still further, the present invention envisages a system according to the above wherein each zone is controlled to minimize the time available for impurities to dissolve in the brine being formed; the time relationship being such as to establish only the requisite increase in sodium chloride concentration of the brine.

It is also an object of this invention to provide a continuous flow system wherein a high purity brine approaching sodium chloride saturation is contacted with an access of source salt so that a sodium chloride saturated brine, having an excess of undissolved source salt and any impurities (soluble and/or insoluble) present carried along therewith, is formed; this region or zone being abruptly and promptly terminated by extraction or separation of the undissolved solids from the saturated, high purity brine, and the solids, containing usable undissolved source salt, being cycled back upstream of the aforesaid point of source salt introduction to be used, in and of itself, for increasing the sodium chloride concentration within a given different zone.

Thus, in connection with the present invention, a continuous flow system is formed, from which a high purity sodium chloride saturated brine is continuously withdrawn at one point and wherein solvent is introduced at another point. Between these points, there are other points at which source salt is introduced so that the sodium chloride content of the solvent is progressively increased. Moreover, each zone or stage within which the sodium chloride content is being increased is terminated promptly, before any substantial amount of impurity goes into solution, by a liquid-solids separation so that, downstream of each such separation point, two streams are formed; one in which the preponderance of liquid in the system is contained and the other of which contains the preponderance of solids in the system. In this fashion, continuously throughout the system, any region defined by a stream which is predominantly brine or solvent is retained at relatively high purity insofar as the undissolved impurities are concerned.

Another important object of the present invention resides in a system concept wherein the zone or stage within which sodium chloride saturation is attained requires also that an excess of undissolved source salt be present in entrainment and as carried along by and with the sodium chloride saturated brine. With this concept, no limitation as to screen size of the source salt need be made, in contrast to prior art techniques wherein fine screen size source salt cannot be utilized.

Other objects and advantages of the invention will appear from the description hereinbelow and the accompanying drawing wherein:

FIG. 2 is a further diagrammatic view illustrating another system according to the present invention; and FIG. 3 is a block diagram illustrating the principles of the present invention.

Figure 1:
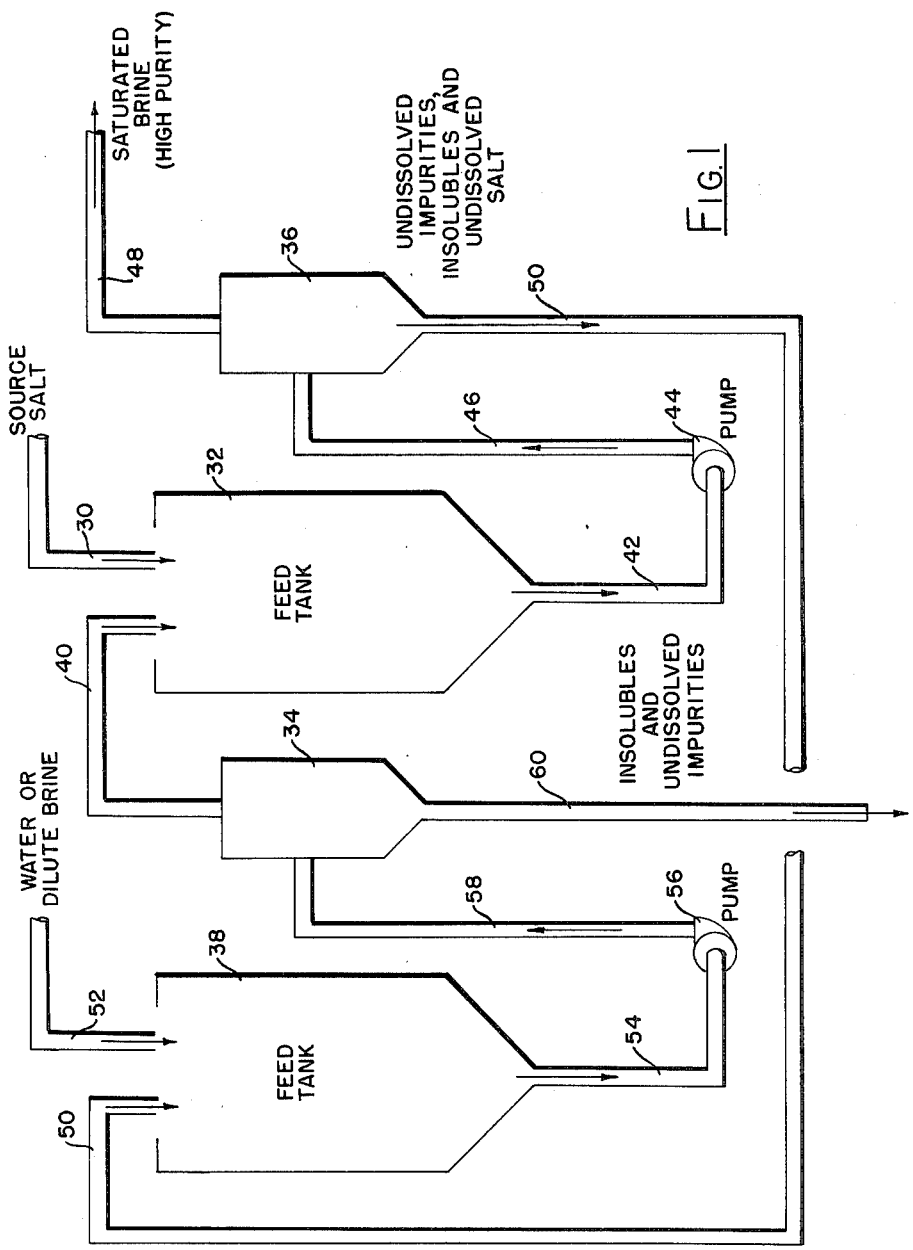
FIG. 1 is a diagrammatic view illustrating a system according to the present invention.

As has been stated, the major soluble impurity in mined rock salt is the mineral anhydrite, the anhydrous form of calcium sulfate. There may be, of course, other impurities present, notably insoluble impurities; but as referred to herein, the term impurity is meant to apply to soluble impurities, and particularly calcium sulfate. The anhydrite or calcium sulfate is mostly present in the source salt in the form of small individual crystals or crystal masses, sometimes so small as to be almost dust-like. The crystals or crystal masses are scattered throughout the individual salt grains, and they are normally enclosed by or included in the salt so that they are not exposed to dissolving except as the salt itself is dissolved away. The calcium sulfate dissolves much more slowly than does sodium chloride so that it is possible to permit a substantial quantity of sodium chloride to go into solution without necessarily dissolving any substantial portion of the calcium sulfate.

The manner in which this is accomplished according to the present invention can be appreciated from a study of FIG. 3. In this figure, the source salt containing contaminants as aforesaid is introduced as indicated by the arrow 10 into the system shown and at the point at which the source salt is introduced, the same is contacted with or otherwise mixed in association with high purity dilute brine as introduced in the line 12. The source salt 10 and the high purity dilute brine 12 are so introduced, proportionally, that the region of the system indicated by the reference character 14 is characterized by a mixture of saturated brine containing, entrained therewithin and carried along thereby, an excess of source salt and the impurities released by the dissolution of the source salt. Since the saturated brine is a solvent for the undissolved calcium sulfate, the region 14 may be stated to be a region of criticality since it is desired to maintain the contact time between the solvent (saturated brine) and the calcium sulfate at a minimum and this is accomplished in the present invention by, substantially immediately upon attainment of sodium chloride saturation, separating the solids from the liquid as achieved in the separator 16 so as to produce, therefrom, a liquid phase which is high purity sodium chloride saturated brine as indicated by reference character 18 and solids in the form of a slurry as indicated by the line 20. The slurry at 20 contains excess source salt which is undissolved, insolubles and/or undissolved calcium sulfate together with sodium chloride saturated brine which acts as a vehicle. The sodium chloride saturated brine in the slurry at 20 constitutes a solvent for the undissolved calcium sulfate but since this saturated brine represents only a minor proportion of the total flow, the region 20 of the system is not of great criticality since even in the event that the saturated brine which is present were to dissolve all the calcium sulfate it could hold, the absolute quantity of such contaminated brine would be so small in proportion to the quantities handled by the system as to represent a relatively insignificant impurity content.

The slurry in the region 20 is then recycled for contact or admixture with solvent at 22 flowing into the system, the contact or admixture being achieved at the upstream point 24 and the resultant mixture in the regions 26 of the system shown is a dilute brine having entrained and carried along therewith insolubles and/or undissolved impurities. That is, in the system shown, all of the excess source salt is dissolved in the region 26. Therefore, the region 26 represents another critical region of the system and for this reason, separation is achieved as indicated at reference character 28 substantially immediately after all the excess source salt from the slurry is dissolved and before any substantial amount of the impurities are permitted to go into solution with the dilute high purity brine. The products of the separation are the dilute high purity brine at the region 12 and the insolubles and/or undissolved calcium sulfate or other impurities at 30 which are removed from the system. Thus, it will be appreciated that the system is divided into different regions, zones or stages; those in which there is a predominance or preponderance of system solvent which contains undissolved impurities and are thus critical; other regions which contain a preponderance or predominance of solids with a minor proportion of system solvent so that these latter regions are not critical, and further regions in which there is substantially only high purity brine with a minimum, if any, solids therein. In this fashion, since the critical regions are terminated immediately upon attainment of the requisite increase in sodium chloride concentration by virtue of the aforesaid liquid-solids separation, a continuous flow system which is of relatively great length may be utilized while still obtaining a very high purity saturated sodium chloride brine. Such a system will be discussed hereinafter in conjunction with FIG. 2.

In the diagram of FIG. 3, the introduction of the source salt 10 may take any desired form. For example as is shown in FIG. 1, the source salt is shown as being continuously or intermittently fed through a suitable conduit 30 into a feed tank 32 wherein a mass of the source salt is formed, the same being either continuously or intermittently replenished by means of the supply conduit 30 as aforesaid. The system of FIG. 1 utilizes a pair of separators 34 and 36 and, in addition to the feed tank 32, an additional feed tank 38. In this particular system, the feed tank 32 receives a supply of high purity dilute brine by means of the conduit 40 and the source salt and the dilute high purity brine are contacted within the feed tank 32 so that the discharge 42 from the feed tank 32 is a mixture of sodium chloride saturated brine, undissolved source salt and insolubles and/or impurities released from the source salt. A suitable pump 44 is utilized to maintain the flow rate at a desired level and to discharge the mixture through the conduit 46 into the separator 36. The discharge of the separator 36 is the liquid fraction at the conduit 48 which contains sodium chloride saturated brine of very high purity and the discharge also includes the conduit 50 containing a slurry of excess undissolved source salt, impurities and/or insolubles together with a minor proportion of the aforesaid saturated brine. The slurry is fed into the feed tank 38 and forms a mass or slurry source therewithin. The slurry and solvent which may take the form of water or dilute high purity brine are contacted within the feed tank 38, the solvent being introduced by the conduit 52 and at a rate proportional to slurry introduction rate so that the discharge from the feed tank at 54 is a mixture of dilute brine plus insolubles and/or undissolved impurities, it being appreciated that there is substantially no undissolved source salt, if any, contained within the mixture introduced into the separator 34. The pump 56 is utilized to maintain the desired flow rate for discharge through the conduit 58 to the separator 34. The liquid portion of the separated products is a high purity dilute brine in the conduit 40 as aforesaid and waste materials or solids in the conduit 60 which consist essentially and substantially only of insolubles and/or undissolved calcium sulfate or other impurities.

The separators in each and every instance are liquid-solids separators and are, preferably of the centrifugal or cyclone type but, in any event, the discharge streams are in one case liquid with substantially no solids entrained therewithin and, in the other case, a slurry containing a high proportion of the solids introduced to the separation point. The rates of flow are adjusted so that in the feed tank 32, a substantial excess of source salt will be picked up and carried along by the solvent and discharged through the conduit 42 and ultimately to the separator 36 so that the slurry in the region 50 will contain the requisite amount of undissolved source salt. At the same time, the proportional amount of solvent introduced at 52 and the flow rates in the regions 54, 58 are adjusted so that residual undissolved sodium chloride in the slurry within the feed tank 38 which may be entrained and carried along by the solvent within the regions 54, 58 is substantially completely dissolved by the time the liquid reaches the separator 34. In this fashion, the slurry from the separator 34 will not contain any appreciable amount of undissolved source salt which would render the system inefficient.

In the embodiment of the invention shown in FIG. 2, there is shown a somewhat modified system into which system solvent is introduced as indicated by the conduit 61 and this solvent is contacted or admixed with a slurry in the conduit 62 which contains a small proportion of excess source salt plus insolubles and/or undissolved impurities. The proportion of solvent introduced at the conduit 61 is adjusted so as to leach out and dissolve all of the excess source salt so that the material fed by the pump 64 to the centrifugal separator 66 through the conduit 68 is a dilute brine having entrained and carried along therewith insolubles and/or undissolved impurities and no or substantially no undissolved source salt. This mixture is separated by the separator 66 to produce the discharge fractions, one in the conduit 70 which is a high purity quite dilute brine (A) and a solids fraction in the conduit 72 which consists of insolubles and/or undissolved impurities plus a minor fraction of the dilute brine. The low sodium chloride concentration dilute brine (A) is circulated through the conduit 70 to be admixed or contacted with a slurry in the conduit 74 for introduction, by means of the pump 76 and conduit 77, to the separator 78. The separator 78 has a solids discharge conduit 62 as aforementioned and has a liquid discharge conduit 80 which contains a dilute high purity brine (B) which is of greater sodium chloride concentration than is the dilute brine (A). The high purity dilute brine (B) is cycled back for admixture or contact with a slurry in the conduit portion 82 and the resultant mixture is pumped by means of the pump 84 to the separator 86, through the conduit 88. The solids discharge of the separator 86 is the aforementioned slurry in the conduit 74 and the liquid discharge is a high purity dilute brine (C) passing outwardly therefrom through the conduit 90. It is to be noted that the high purity brine (C) is of greater concentration than is the dilute brine (B). The dilute brine (C) is circulated for contact or admixture with a source salt supply as indicated by reference character 92, the same having a discharge conduit 94 leading into a suitable mixing or contacting device 96. The rates of flow of the dilute brine (C) and the source salt are so adjusted that the discharge of the mixing device 96, in the conduit 98, consists of a sodium chloride saturated brine carrying along and having entrained therein an excess of source salt plus insolubles and/or undissolved impurities. The pump 100 directs this mixture into the separator 102 where separation of the liquid and solids is effected to produce a high purity sodium chloride saturated brine in the conduit 104 and the aforementioned slurry in the conduit 82.

In the system as is shown in FIG. 2, it will be once again appreciated that the system is divided or segregated into a series of different types of regions, some of which contain a predominance of the solvent while others contain a predominance of the solids. Thus, the regions are of critical and uncritical relationship. The uncritical regions are those defined by the conduit 70 since the dilute brine contained therein is of high purity and contains substantially no entrained solids; the region defined by the conduit 80 is likewise a region of non-criticality as is the region defined by the conduit 90. Furthermore, the regions defined by the conduits 62, 74 and 82 are regions of non-criticality up to the point of their admixture with the predominance of solvent from the respective conduits 60, 70 and 80. On the other hand, regions of criticality are defined by the conduit 68, by the conduit 77 and by the conduit 88 as well as the conduit 98. Thus, in accord with the present invention, substantially immediate separation of the solids and liquid in the critical regions is effected by the various separators 66, 78, 86 and 102 before any substantial amount of the undissolved impurities are permitted to go into solution with the solvent in each case. It will be appreciated that the system of FIG. 2 is adjusted in its flow of source salt through the conduit 94 so as to obtain a sufficient excess of undissolved source salt in the various slurries at 82, 74 and 62 so that the latter slurry, in the conduit 62, when mixed with the solvent through the conduit 60 permits substantially all of the remaining excess source salt to be leached from the slurry in the conduit 62. It will also be appreciated that as many additional separation stages may be added to the system of FIG. 2 as may be desired or necessary. To this end, it will be seen that as the flow rate within the system is increased, to obtain a higher purity brine in the discharge line 104, more stages will be required since the contact time between the solvent and source salt or slurries containing the undissolved source salt will be lessened accordingly.

In any event, the present system is characterized by a zone within which a high purity sodium chloride saturated brine is formed; this region being terminated by a liquid-solids separator in which the usable solids fraction (since it contains undissolved source salt) is cycled back to some upstream point in the system for recovery of the undissolved source salt. This recovery may take place in one or a plurality of stages, as is demonstrated by FIGS. 1 and 2 respectively. Thus, the system according to the present invention incorporates a continuous flow of brine in one direction with periodic extraction or extractions of solids which are then recycled back in the opposite direction of brine flow and reintroduced into the brine or solvent for recovery of undissolved source salt. Additionally, an excess of source salt is introduced into the system at that point which initiates the region of sodium chloride saturated brine formation so that the solids obtained at the termination of such region or stage will necessarily contain undissolved source salt whereby the solids when recycled will provide for increase in sodium chloride concentration within that upstream stage which is initiated by the reintroduction of such solids. By this means, each zone which is initiated by the introduction of solids may be terminated as soon as the desired increase in sodium chloride concentration has taken place, and before any substantial amount of impurity has gone into solution.

It is to be understood that certain changes and modifications as illustrated and described may be made without departing from the spirit of the invention or the scope of the following claims.

I claim:

1. The method of continuously making, at a high flow rate with no shutdown time, a high purity sodium chloride brine from a source of sodium chloride containing impurities having a dissolution rate less than the dissolution rate of sodium chloride, which comprises:

as an initial stage, continuously cocurrently flowing a high purity dilute sodium chloride brine from a next successive stage into contact with source salt at a flow rate sufficient to entrain a quantity of source salt in excess of that required for sodium chloride saturation of the dilute brine, continuously and positively separating the flowing brine from the solids entrained therein substantially immediately upon attainment of substantially sodium chloride saturated brine and discharging said brine, continuously introducing the solids separated in the initial stage to a next succeeding stage, as a final stage, continuously cocurrently flowing the separated solids from a next preceding stage with fresh sodium chloride solvent in a ratio of solids to solvent such as to dissolve substantially all of the undissolved sodium chloride from the solids and substantially without dissolving any impurities to form a dilute brine while flowing the dilute brine at a rate to entrain and carry along any residual solids, substantially immediately continuously and positively separating the dilute brine and the residual solids and discharging said solids to waste, and continuously directing dilute brine obtained from said final stage into contact with source salt as the dilute brine of the next preceding stage, whereby the flow of brine is countercurrent from the final to the initial stage and cocurrent within the individual stages.

2. The method according to claim 1 wherein there are at least three stages of source salt and solvent introduction and in which all but the initial stage are supplied by sodium chloride containing solids extracted from the respective next preceding stages and all but the final stage are supplied by dilute brine extracted from the respective next succeeding stages.

3. The method according to claim 1 wherein said steps of continuously and positively separating the brine and solids are effected by centrifugal separation.

4. The method of continuously making at a high flow rate with no shutdown time, a high purity sodium chloride brine from a source of sodium chloride containing impurities having a dissolution rate less than the dissolution rate of sodium chloride, which comprises:

as a first stage, continuously cocurrently flowing a high purity dilute sodium chloride brine from a second stage into contact with source salt at a flow rate sufficient to entrain a quantity of source salt in excess of that required for sodium chloride saturation of the dilute brine, continuously and positively separating the flowing brine from the solids entrained therein substantially immediately upon attainment of sodium chloride saturated brine and discharging said brine, continuously introducing the solids separated in the first stage to a second stage, as a second stage, continuously cocurrently flowing the separated solids from said first stage with sodium chloride solvent in a ratio of solids to solvent such as to dissolve substantially all of said undissolved sodium chloride and substantially without dissolving any impurities to form a high purity dilute brine, and at a solvent flow rate to entrain and carry along the undissolved impurities, substantially immediately continuously and positively separating the dilute brine and the undissolved impurities from said second stage and discharging the undissolved impurities to waste, and continuously directing the dilute brine obtained from said second stage into contact with the source salt as the dilute brine of the first stage, whereby the flow of brine is countercurrent from the final to the initial stage and cocurrent within the individual stages.

5. The method according to claim 4 wherein said steps of continuously and positively separating the brine and solids are effected by centrifugal separation.

6. The method of continuously making at a high flow rate with no shutdown time, a high purity sodium chloride brine from a source of sodium chloride containing impurities having a dissolution rate less than the dissolution rate of sodium chloride, which comprises:

intermittently dissolving sodium chloride from source salt through at least three stages including as a first stage, continuously cocurrently flowing a high purity dilute sodium chloride brine from a next succeeding intermediate stage into contact with source salt at a flow rate sufficient to entrain a quantity of source salt in excess of that required for sodium chloride saturation of the dilute brine, continuously and positively separating the flowing brine from the solids entrained therein substantially immediately upon attainment of sodium chloride saturated brine and discharging said brine, continuously introducing the solids separated in the initial stage to a next succeeding stage, as an intermediate stage, continuously cocurrently flowing the separated solids from a next preceding stage with dilute brine from a next succeeding stage in a ratio of solids to dilute feed brine such as to dissolve only some of the undissolved sodium chloride to form a dilute brine and at a flow rate to entrain and carry along the solids, substantially immediately continuously and positively separating the dilute brine and the solids and directing said dilute brine into contact with source salt in a next preceding stage, as a final stage, continuously cocurrently flowing the solids from a next preceding intermediate stage with sodium chloride solvent in a ratio of solids to solvent such as to dissolve substantially all of the undissolved sodium chloride to form dilute brine and at a flow rate to entrain and carry along the undissolved impurities, and substantially immediately continuously and positively separating the dilute brine from the undissolved impurities and discharging the latter to waste and the dilute brine as feed brine in the next preceding intermediate stage, whereby the flow of brine is countercurrent from the final to the initial stage and cocurrent within the individual stages.

7. The method according to claim 6 wherein said steps of continuously and positively separating the brine and solids are effected by centrifugal separation.

8. The method of continuously making at a high flow rate with no shutdown time, a high purity sodium chloride brine from a source salt containing impurities which have a dissolution rate less than the dissolution rate of sodium chloride, which comprises:

as an initial stage, continuously cocurrently flowing a high purity dilute sodium chloride brine from a next succeeding stage into contact with fresh source salt at a flow rate sufficient to entrain a quantity of source salt in excess of that required for sodium chloride saturation of said dilute brine, continuously and positively separating the flowing brine from the solids entrained therein immediately upon attainment of substantially sodium chloride saturated brine and discharging said brine, as successive intermediate stages, continuously and successively cocurrently flowing successively separated solids from the respective next preceding stages as source salts and high purity dilute sodium chloride brines from the respective next succeeding stages in a ratio of solids to brine such as to dissolve only some of the undissolved sodium chloride from the solids to form brines of successively increased sodium chloride saturation and successively decrease the percentage of sodium chloride in the respective successively extracted solids, as a final stage, continuously cocurrently flowing a sodium chloride solvent and solids from the next preceding intermediate stage in a ratio of solids to solvent to dissolve substantially all undissolved sodium chloride from said solids to form a high purity dilute sodium chloride brine and at a flow rate to entrain and carry along the undissolved impurities, and substantially immediately continuously and positively separating the undissolved impurities from the brine in the final stage and continuously discharging the impurities to waste and continuously feeding said last mentioned brine for successive cocurrent flow with solids in the last intermediate stage, whereby the flow of brine is countercurrent from the final to the initial stage and cocurrent within the individual stages.

9. The method according to claim 8 wherein said steps of continuously and positively separating the brine and solids are effected by centrifugal separation.

References Cited by the Examiner

UNITED STATES PATENTS

| | | | |
|---|---|---|---|
| 1,589,519 | 6/1926 | Dolbear | 23—312 |
| 2,412,560 | 12/1946 | Bolton | 23—310 |
| 2,734,804 | 2/1956 | Courthope | 23—312 |
| 3,130,016 | 4/1964 | Grier | 23—312 |
| 3,168,379 | 2/1965 | Miller | 23—312 |

FOREIGN PATENTS

| | | |
|---|---|---|
| 499,538 | 1/1954 | Canada. |
| 511,795 | 4/1955 | Canada. |
| 556,684 | 4/1958 | Canada. |

OTHER REFERENCES

Chemical Engineer's Handbook, Perry, 3rd ed., McGraw-Hill Book Co., 1950 (pages 714–718 relied on).

NORMAN YUDKOFF, *Primary Examiner.*